(12) United States Patent
Benjamin et al.

(10) Patent No.: US 11,733,531 B1
(45) Date of Patent: Aug. 22, 2023

(54) ACTIVE HEADS UP DISPLAY SYSTEM

(71) Applicant: GM GLOBAL TECHNOLOGY OPERATIONS LLC, Detroit, MI (US)

(72) Inventors: Tessa E. Benjamin, Brighton, MI (US); Jeffrey P. Dinakar, Novi, MI (US); Andrew Wassef, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 29 days.

(21) Appl. No.: 17/696,294

(22) Filed: Mar. 16, 2022

(51) Int. Cl.
 G02B 27/01 (2006.01)
 G06F 3/01 (2006.01)

(52) U.S. Cl.
 CPC ......... G02B 27/0179 (2013.01); G06F 3/013 (2013.01); *G02B 2027/0187* (2013.01)

(58) Field of Classification Search
 CPC ........ G02B 27/0179; G02B 2027/0187; G06F 3/013
 See application file for complete search history.

(56) References Cited

U.S. PATENT DOCUMENTS

| | | | |
|---|---|---|---|
| 10,228,558 B2* | 3/2019 | Aleem | G02B 27/0172 |
| 10,809,801 B1* | 10/2020 | Weng | G06F 3/1423 |
| 11,663,783 B2* | 5/2023 | Goslin | G06F 3/011 |
| | | | 345/633 |
| 2002/0105482 A1* | 8/2002 | Lemelson | G06F 3/013 |
| | | | 345/32 |
| 2003/0020755 A1* | 1/2003 | Lemelson | G06F 3/013 |
| | | | 715/786 |
| 2005/0264527 A1* | 12/2005 | Lin | G06F 3/011 |
| | | | 345/156 |
| 2015/0062168 A1* | 3/2015 | Ng-Thow-Hing | |
| | | | G02B 27/0101 |
| | | | 345/633 |
| 2016/0187651 A1* | 6/2016 | Border | G06F 3/011 |
| | | | 345/8 |
| 2016/0325683 A1* | 11/2016 | Hayashi | H04N 13/383 |
| 2016/0342205 A1* | 11/2016 | Shigeta | G06V 10/147 |
| 2017/0269370 A1* | 9/2017 | Sato | G06F 3/013 |
| 2017/0270899 A1* | 9/2017 | Sato | B60R 1/00 |
| 2019/0043088 A1* | 2/2019 | Garcia | B60R 1/00 |
| 2020/0368616 A1* | 11/2020 | Delamont | G06F 3/011 |
| 2021/0055548 A1* | 2/2021 | Rao | G09G 3/3426 |
| 2021/0173471 A1* | 6/2021 | Johnson | G06T 19/20 |
| 2021/0276419 A1* | 9/2021 | Ng | B60K 37/06 |
| 2021/0333869 A1* | 10/2021 | Cho | B60K 35/00 |
| 2022/0121867 A1* | 4/2022 | Arar | G06V 20/588 |
| 2022/0187907 A1* | 6/2022 | Lee | G06F 3/04842 |

(Continued)

*Primary Examiner* — Dmitriy Bolotin
(74) *Attorney, Agent, or Firm* — Quinn IP Law

(57) ABSTRACT

An active heads up display system includes a driver monitoring system, a gateway circuit, and a heads up display. The driver monitoring system tracks a gaze direction of a user, calculates track values in response to a field of view of the user based on the gaze direction, and transmits the track values on a first bus. The gateway circuit receives the track values from the first bus, translates the track values to command values, and transmits the command values on a second bus. The heads up display receives the command values from the second bus, generates a graphical presentation viewable by the user, projects the graphical presentation at a current position in front of the user, and adjusts the current position to an updated position centered within the field of view of the user in response to the command values.

20 Claims, 3 Drawing Sheets

(56) References Cited

U.S. PATENT DOCUMENTS

2022/0281317 A1\* 9/2022 Ahn ................. G06T 5/006
2023/0168788 A1\* 6/2023 Faulkner ............ G06F 3/04815
                                                           715/708

\* cited by examiner

ACTIVE HEADS UP DISPLAY SYSTEM

INTRODUCTION

The present disclosure relates to a system and a method for operation of an active heads up display system.

Existing heads up displays project information focused at a point floating in space in front of a driver. The floating information allows the driver to see the information while simultaneously viewing the road. Depending on a height of a particular driver and where the driver is positioned in a seat, the floating information may be too high, too low, too far left, too far right, or at an appropriate location above the dashboard.

Accordingly, those skilled in the art continue with research and development efforts in the field of active position adjustments of heads up displays.

SUMMARY

An active heads up display system is provided herein. The active head up display system includes a driver monitoring system, a gateway circuit, and a heads up display. The driver monitoring system is configured to track a gaze direction of a user in a three dimensional coordinate system, calculate one or more track values in response to a field of view of the user based on the gaze direction, and transmit the one or more track values on a first bus. The gateway circuit is configured to receive the one or more track values from the first bus, translate the one or more track values to one or more command values, and transmit the one or more command values on a second bus. The heads up display is configured to receive the one or more command values from the second bus, generate a graphical presentation viewable by the user, project the graphical presentation at a current position in the three dimensional coordinate system in front of the user, and adjust the current position in the three dimensional coordinate system to an updated position centered within the field of view of the user in response to the one or more command values.

In one or more embodiments of the active heads up display system, the heads up display is further configured to transmit the current position of the graphical presentation to the gateway circuit via the second bus, the gateway circuit is further configured to transfer the current position of the graphical presentation to the driver monitoring system via the first bus, and the driver monitoring system is further configured to receive the current position of the graphical presentation from the first bus.

In one or more embodiments of the active heads up display system, the calculation of the one or more track values is in further response to the current position of the graphical presentation.

In one or more embodiments of the active heads up display system, the one or more track values solely adjusts a vertical position of the graphical presentation to account for one or more of a pitch and a height of a head of the user.

In one or more embodiments of the active heads up display system, the one or more track values adjust both a horizontal position and a vertical position of the graphical presentation.

In one or more embodiments of the active heads up display system, the gaze direction is an eye gaze direction.

In one or more embodiments of the active heads up display system, the driver monitoring system is further configured to track a head orientation of the user while the eye gaze direction of the user is unknown, and the one or more track values are calculated based on the head orientation while the eye gaze direction of the user is unknown.

In one or more embodiments of the active heads up display system, the heads up display is positioned between the user and a windshield, and the heads up display projects the graphical presentation onto the windshield.

In one or more embodiments of the active heads up display system, the gateway circuit is further configured to maintain the one or more command values constant in response to the track values indicating that the gaze direction is off the windshield.

A method of operation in an active heads up display system is provided herein. The method includes tracking a gaze direction of a user in a three dimensional coordinate system with a driver monitoring system, calculating one or more track values in response to a field of view of the user based on the gaze direction, transmitting the one or more track values on a first bus, receiving the one or more track values from the first bus at a gateway circuit, and translating the one or more track values to one or more command values.

The method further includes transmitting the one or more command values on a second bus, receiving the one or more command values from the second bus at a heads up display, generating a graphical presentation viewable by the user, projecting the graphical presentation at a current position in the three dimensional coordinate system in front of the user, and adjusting the current position in the three dimensional coordinate system to an updated position centered within the field of view of the user with the heads up display in response to the one or more command values.

In one or more embodiments, the method includes transmitting the current position of the graphical presentation to the gateway circuit via the second bus, transferring the current position of the graphical presentation to the driver monitoring system via the first bus, and receiving the current position of the graphical presentation at the driver monitoring system from the first bus.

In one or more embodiments of the method, the calculating of the one or more track values is in further response to the current position of the graphical presentation.

In one or more embodiments of the method, the one or more track values solely adjusts a vertical position of the graphical presentation to account for one or more of a pitch and a height of a head of the user.

In one or more embodiments of the method, the one or more track values adjust both a horizontal position and a vertical position of the graphical presentation.

In one or more embodiments of the method, the gaze direction is an eye gaze direction.

In one or more embodiments, the method includes tracking a head orientation of the user with the driver monitoring system while the eye gaze direction of the user is unknown. The one or more track values are calculated based on the head orientation while the eye gaze direction of the user is unknown.

In one or more embodiments of the method, the heads up display is positioned between the user and a windshield, and the heads up display projects the graphical presentation onto the windshield.

In one or more embodiments, the method includes maintaining the one or more command values constant in the gateway circuit in response to the track values indicating that the gaze direction is off the windshield.

A vehicle is provided herein. The vehicle includes a windshield and an active heads up display system. The active heads up display system includes a driver monitoring system, a gateway circuit, and a heads up display. The driver monitoring system is configured to track a gaze direction of a user in a three dimensional coordinate system, calculate one or more track values in response to a field of view of the user based on the gaze direction, and transmit the one or more track values on a first bus. The gateway circuit is configured to receive the one or more track values from the first bus, translate the one or more track values to one or more command values, and transmit the one or more command values on a second bus. The heads up display is configured to receive the one or more command values from the second bus, generate a graphical presentation viewable by the user, project the graphical presentation on the windshield at a current position in the three dimensional coordinate system in front of the user, and adjust the current position in the three dimensional coordinate system to an updated position centered within the field of view of the user in response to the one or more command values.

In one or more embodiments of the vehicle, the heads up display is a dual-plane heads up display.

The above features and advantages and other features and advantages of the present disclosure are readily apparent from the following detailed description of the best modes for carrying out the disclosure when taken in connection with the accompanying drawings.

DETAILED DESCRIPTION

Embodiments of this disclosure generally provide an active heads up display system that automatically adjusts a position of a heads up display to follow a field of view of a user. The active heads up display system uses eye gaze or head tracking information from a driver monitoring system to determine an optimal height and/or horizontal position to place information in front of the user. While the information is non-optimal, the driver monitoring system generates one or more track signals to instruct a heads up display to move a current position of the information toward a center of a field of view of the user. A gateway circuit is disposed between the driver monitoring system and the heads up display to transform the track signals into command signals readily recognized by the heads up display.

Figure 1:
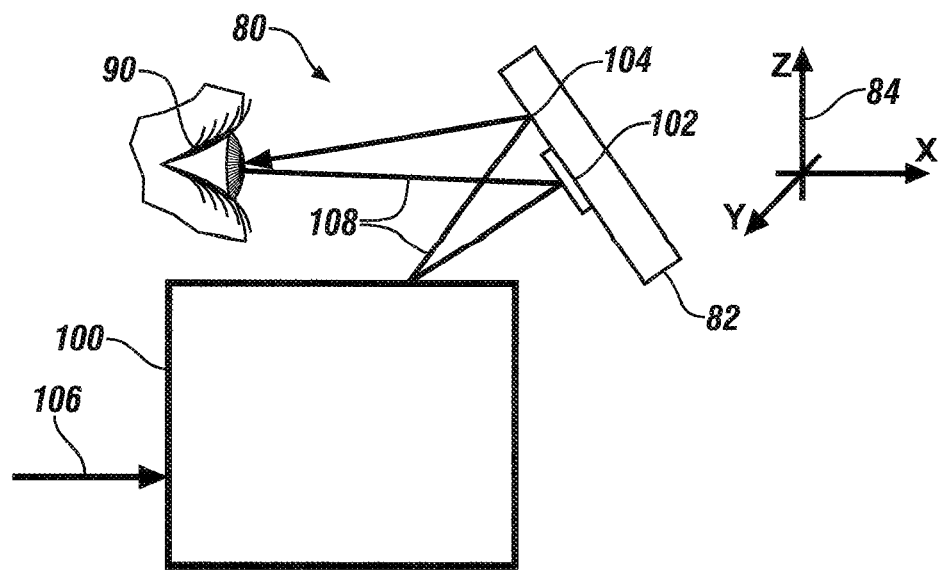
FIG. 1 is a schematic diagram illustrating a vehicle in accordance with one or more embodiments.

Referring to FIG. 1, a schematic diagram illustrating an example implementation of a vehicle 80 is shown in accordance with one or more embodiments. The vehicle 80 generally comprises a windshield 82 and an active heads up display system 100. A three dimensional coordinate system 84 may define a space (e.g., X, Y, Z) in front of a user 90.

An image data signal 106 is received by the active heads up display system 100. The image data signal 106 generally conveys information used by the active heads up display system 100 to generate an optical signal 108 carrying one or more graphical presentations (see FIG. 3) that are visible to the user 90. The optical signal 108 may be presented by the active heads up display system 100 and seen by the user 90. The optical signal 108 projects the graphical presentation to provide information to the user 90.

The vehicle 80 implements a mobile vehicle, such as an automobile, a truck, a motorcycle, a boat, a train and/or an aircraft. The vehicle 80 is configured to carry the user 90, one or more passengers, and assorted cargo.

The windshield 82 implements a transparent windshield. The windshield 82 is generally positioned toward a front end of the vehicle 80 and provides the user 90 with a clear view of the environment ahead of the vehicle 80. The windshield 82 is operational to reflect the images received from the active heads up display system 100 toward the user 90.

The user 90 is a driver of the vehicle 80. The user 90 manually controls a variety of functions in the vehicle 80. In various embodiments, the user 90 may control a steering, an acceleration, a braking, and a gear selection by entering manual commands into various driver controls. The graphical presentations generated by the active heads up display system 100 are visible to the user 90 while the user 90 is looking forward through the windshield 82.

The active heads up display system 100 implements a single-plane heads up display system or a dual-plane heads up display system. The active heads up display system 100 is positioned between the user 90 and the windshield 82. The active heads up display system 100 is configured to generate the graphical presentation based on the information received in the image data signal 106. In the single-plane embodiments, the active heads up display system 100 may project the graphical presentation as a single image that appears to the user 90 to float near the windshield 82 and is centered at a current position 102 in the three dimensional coordinate system 84. In the dual-plan embodiments, the active heads up display system 100 may project the graphical presentation as a near image and a far image. The near image appears to the user 90 to float near the windshield 82 and is centered at the current position 102 along the windshield 82. The far image appears to the user 90 to float beyond the near image, past the windshield 82, and is centered at the current position 102. In response to a change in a gaze direction of the user 90, the active heads up display system 100 may move the graphical presentation from the current position 102 to an updated position 104.

Figure 2:
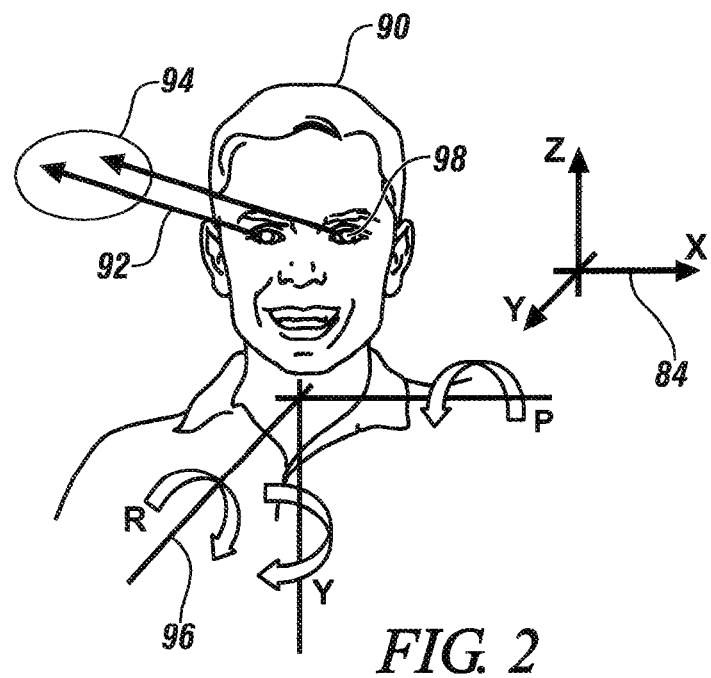
FIG. 2 is a side view schematic diagram of a user in accordance with one or more exemplary embodiments.

Referring to FIG. 2, a side view schematic diagram of an example user 90 is shown in accordance with one or more exemplary embodiments. The user 90 is constantly looking in a gaze direction 92. A field of view 94 for the user 90 is centered on the gaze direction 92 and covers a region within the three dimensional coordinate system 84. While the eyes 98 of the user 90 are measurable by the active heads up display system 100, the active heads up display system 100 determines a spatial direction (e.g., a vector) for the gaze direction 92.

In some conditions, the eyes 98 of the user 90 are not detectable and so the gaze direction 92 cannot be determined based on the eyes 98. Therefore, the active heads up display system 100 is also configured to measure a head orientation 96 of the user 90. The head orientation 96 is generally measured in terms of pitch, roll and yaw (e.g., P, R, Y)

and/or height (e.g., Z). The active heads up display system 100 may translate the pitch, roll, and yaw and/or height into the gaze direction 92 in the three dimensional coordinate system 84. In conditions where neither the eyes 98 of the user 90 nor the head orientation 96 of the user 90 are detected, the active heads up display system 100 may default the gaze direction 92 to either the last known direction or straight forward through the windshield 82 at a predetermined height. Therefore, the current position 102 of the active heads up display system 100 may be higher for a taller-than-average user 90, lower for a shorter-than-average user 90, and in between for an average height user 90.

Figure 3:
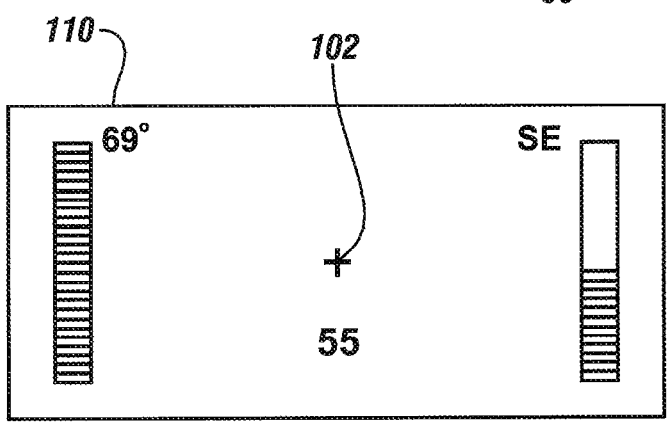
FIG. 3 is a side diagram of a graphical presentation in accordance with one or more exemplary embodiments.

Referring to FIG. 3, a side diagram of an example implementation of a graphical presentation 110 generated by the active heads up display system 100 is shown in accordance with one or more exemplary embodiments. The graphical presentation 110 (or floating information) may include multiple graphic icons, text, and/or numerical information. The information may include a speed of the vehicle 80, a fuel level, an engine temperature, a direction of travel, an ambient temperature, and the like. The graphical presentation 110 is generally centered horizontally and vertically at the current position 102. The current position 102 may default to a fixed position when the vehicle is first powered on.

Figure 4:
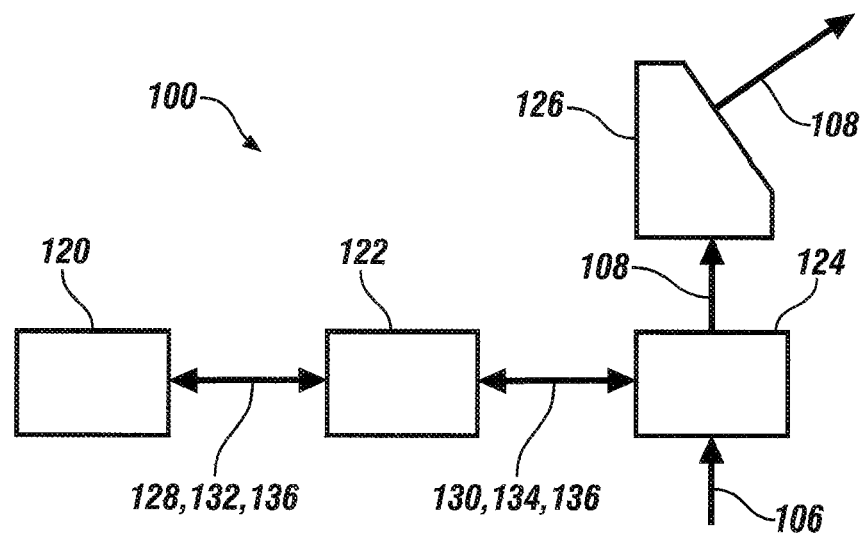
FIG. 4 is a schematic block diagram of an active heads up display system in accordance with one or more exemplary embodiments.

Referring to FIG. 4, a schematic block diagram of an example implementation of the active heads up display system 100 is shown in accordance with one or more exemplary embodiments. The active heads up display system 100 generally includes a driver monitoring system 120 (DMS), a gateway circuit 122 (GC), a heads up display 124 (HUD), an optical setup 126 (OPT), a first bus 128 and a second bus 130.

The image data signal 106 may be received by the heads up display 124. The first bus 128 provides bidirectional communication between the driver monitoring system 120 and the gateway circuit 122. The second bus 130 provides bidirectional communication between the gateway circuit 122 and the heads up display 124. The heads up display 124 generates the optical signal 108 that is viewable by the user 90.

The driver monitoring system 120 implements a monitor configured to determine the gaze direction 92 of the user 90. The driver monitoring system 120 generates one or more track values 132 representative of the field of view 94 of the user 90 based on the gaze direction 92. In an eye mode, the driver monitoring system 120 determines the gaze direction 92 based on where the eyes 98 of the user 90 (or driver) are pointed in the X, Y, Z space (see FIG. 2). In a head mode, the driver monitoring system 120 determines the gaze direction 92 based on the P, R, Y head orientation 96 (see FIG. 2). In various embodiments, the driver monitoring system 120 may be a commercially available driver monitoring system.

The driver monitoring system 120 is also configured to calculate differences between where the user 90 is looking and where the heads up display 124 is projecting the graphical presentation 110 on the windshield 82. The driver monitoring system 120 generates one or more track values 132 in response to the field of view 94 of the user 90 based on the gaze direction 92, and in response to the current position 102 of the heads up display 124.

In various embodiments, some track values 132 may convey a vertical difference between the gaze direction 92 of the user 90 and the current position 102 of the heads up display 124. In some embodiments, other track values 132 may convey a horizontal (or azimuth) difference between the gaze direction 92 of the user 90 and the current position 102 of the heads up display 124. The track values 132 are transmitted by the driver monitoring system 120 in a track signal on the first bus 128 to the gateway circuit 122. One or more position values 136 of the current position 102 of the heads up display 124 is received by the driver monitoring system 120 in a position signal on the first bus 128 from the gateway circuit 122.

The gateway circuit 122 implements a video control unit. The gateway circuit 122 is operational to provide bidirectional communication with the driver monitoring system 120 via the first bus 128. The gateway circuit 122 is also operational to provide bidirectional communication with the heads up display 124 via the second bus 130.

The track values 132 received from the driver monitoring system 120 are translated by the gateway circuit 122 into command values 134. The command values 134 are transmitted from the gateway circuit 122 to the heads up display 124 in a command signal on the second bus 130. The position values 136 of the heads up display 124 are received by the gateway circuit 122 as a position signal on the second bus 130. The gateway circuit 122 retransmits the position values 136 to the driver monitoring system 120 via the first bus 128.

The heads up display 124 implements a windshield-based single-plane or dual-plane heads up display. The heads up display 124 is operational to generate the graphical presentation 110 in the optical signal 108 based on the information received in the image data signal 106. The graphical presentation 110 may be a sequence of images at a frame rate. In various embodiments, the heads up display 124 may be a commercially available heads up display.

The graphical presentation 110 is projected toward the windshield 82 centered around the current position 102. The heads up display 124 reports the current position 102 of the graphical presentation 110 in the position values to the gateway circuit 122 via the second bus 130. The heads up display 124 is also operational to change the current position 102 of the graphical presentation 110 to the updated position 104 in response to the command values received via the second bus 130. As the graphical presentation 110 is moved, the current position 102 changes to the updated position 104.

Embodiments of the driver monitoring system 120, the gateway circuit 122, and the heads up display 124 generally include one or more microcontrollers. Each microcontroller may include one or more processors, each of which may be embodied as a separate processor, an application specific integrated circuit (ASIC), a field programmable gate array (FPGA), or a dedicated electronic control unit.

The microcontrollers may be various electronic processors (implemented in hardware, software executing on hardware, or a combination of both). The microcontrollers may also include tangible, non-transitory memory, (e.g., read-only memory in the form of optical, magnetic, and/or flash memory). For example, a microcontroller may include application-suitable amounts of random-access memory, read-only memory, flash memory and other types of electrically-erasable programmable read-only memory, as well as accompanying hardware in the form of a high-speed clock or timer, analog-to-digital and digital-to-analog gateway circuitry, and input/output gateway circuitry and devices, as well as appropriate signal conditioning and buffer gateway circuitry.

Computer-readable and executable instructions embodying the present disclosure may be stored in the memory and executed as set forth herein. The executable instructions may be a series of instructions employed to run applications on the microcontrollers (either in the foreground or background). The microcontrollers may receive commands and information, in the form of one or more input signals from various controls or components in the vehicle 80 and communicate the commands and information to the heads up display 124 through the image data signal 106.

The optical setup 126 may implement one or more mirrors and/or lenses that direct the optical signal 108 onto the windshield 82. The mirrors may be curved to adjust focal point(s) of the image(s).

The first bus 128 implements a bidirectional data bus. In various embodiments, the first bus 128 is a control area network (CAN) bus. The first bus 128 is operational to convey the track values 132 that cause the heads up display 124 to adjust a vertical position and/or a horizontal position of the graphical presentation 110 from the driver monitoring system 120 to the gateway circuit 122. The first bus 128 may also be operational to carry position values 136 of the actual current position 102 of the graphical presentation 110 from the heads up display 124, through the gateway circuit 122, to the driver monitoring system 120.

The second bus 130 implements another bidirectional communication bus. In some embodiments, the second bus 130 is an inter-integrated gateway circuit (I2C) serial bus. The second bus 130 is operational to convey the command values 134 (transformed versions of the track values 132) from the gateway circuit 122 to the heads up display 124. The second bus 130 is also operational to carry the position values 136 of the graphical presentation 110 from the heads up display 124 back to the gateway circuit 122 and on to the driver monitoring system 120 via the first bus 128.

Figure 5:
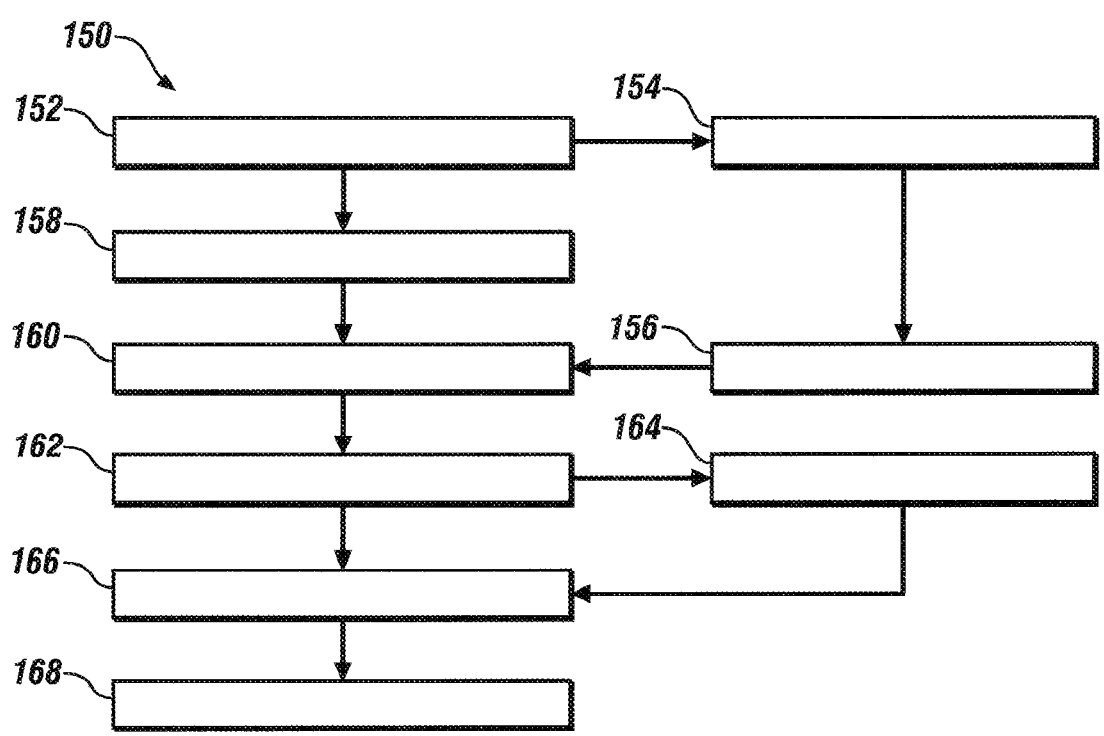
FIG. 5 is a flow diagram of a method of operation for a driver monitoring system in accordance with one or more exemplary embodiments.

Referring to FIG. 5, a flow diagram of an example method 150 of operation for the driver monitoring system 120 is shown in accordance with one or more exemplary embodiments. The method 150 (or process) may be implemented within the driver monitoring system 120. The method 150 includes steps 152 to 168, as illustrated. The sequence of steps is shown as a representative example. Other step orders may be implemented to meet the criteria of a particular application.

In the step 152, the driver monitoring system 120 (DMS) determines if eye tracking of the user 90 is available or not available If eye tracking is not available, the driver monitoring system 120 switches to tracking a head orientation 96 of the user in the step 154. Thereafter, the head orientation 96 is translated to the gaze direction 92 in the step 156. If the eye tracking is available, the driver monitoring system 120 determines the eye gaze direction 92 in the step 158. Position values 136 of the current position 102 of the graphical presentation 110 are received by the driver monitoring system 120 from the heads up display 124 (HUD) via the gateway circuit 122 (GC) in the step 160.

In the step 162, the driver monitoring system 120 determines if the gaze direction 92 is changed or unchanged. The determination may be based on comparing a current gaze direction 92 with a previously measured gaze direction and/or comparing an alignment of the current gaze direction 92 with the current position 102 of the graphical presentation 110. If the gaze direction 92 is unchanged, the driver monitoring system 120 generates the track values 132 in the step 164 to keep the current position 102 of the graphical presentation 110 unaltered. If the field of view 94 of the gaze direction 92 does not align with the current position 102 of the graphical presentation 110, the track values 132 are calculated in the step 166 to drive the graphical presentation 110 into the field of view 94. The track values 132 are transmitted from the driver monitoring system 120 in the step 168 on the first bus 128 to the gateway circuit 122. The gateway circuit 122 translates and subsequently relays the values to the heads up display 124 to implement the move.

Figure 6:
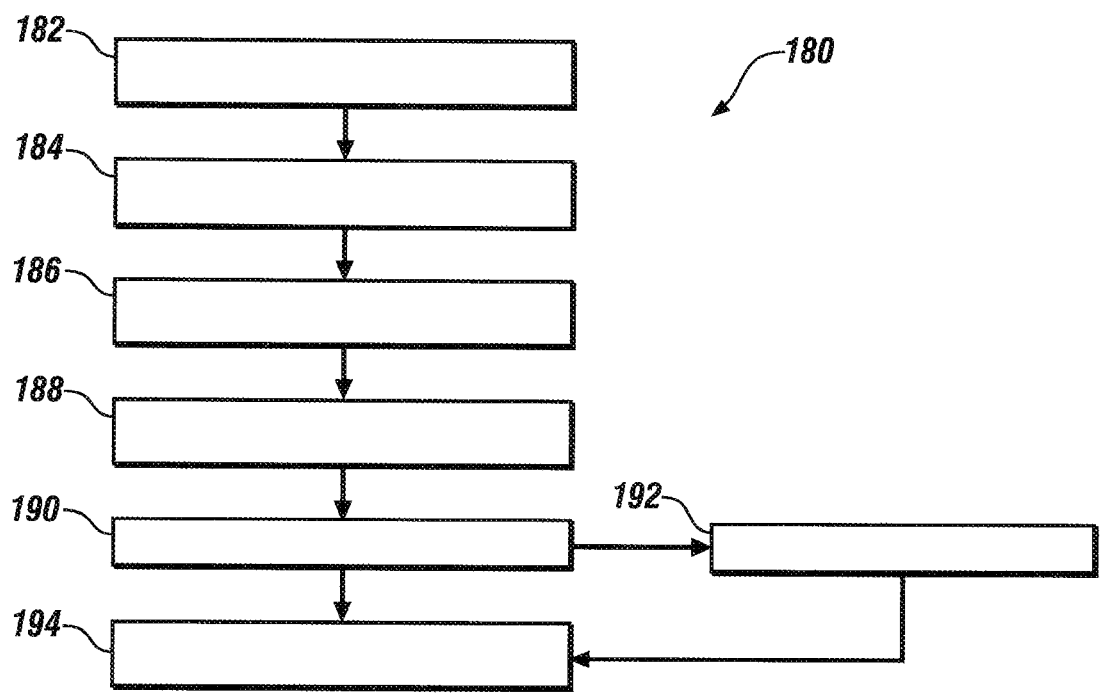
FIG. 6 is a flow diagram of a method of operation in a gateway circuit in accordance with one or more exemplary embodiments.

Referring to FIG. 6, a flow diagram of an example method 180 of operation in the gateway circuit 122 is shown in accordance with one or more exemplary embodiments. The method 180 (or process) is implemented by the gateway circuit 122. The method 180 includes steps 182 to 194, as illustrated. The sequence of steps is shown as a representative example. Other step orders may be implemented to meet the criteria of a particular application.

In the step 182, the gateway circuit 122 (GC) receives the position values 136 for the current position 102 of the graphical presentation 110 from the heads up display 124 (HUD) via the second bus 130. The gateway circuit 122 retransmits the position values 136 to the driver monitoring system 120 (DMS) in the step 184 via the first bus 128.

In the step 186, the gateway circuit 122 receives the track values 132 from the driver monitoring system 120. The track values 132 are translated to the command values 134 in the step 188. The gateway circuit 122 determines in the step 190 if the driver monitoring system 120 is trying to move the graphical presentation 110 off the windshield 82. If yes, the gateway circuit 122 freezes the command values 134 to maintain the graphical presentation 110 at a current position along an edge of the windshield 82 in the step 192. If the requested move remains on the windshield 82, the gateway circuit 122 transmits the command values 134 to the heads up display 124 via the second bus 130 in the step 194. The heads up display 124 subsequently moves the graphical presentation 110 as commanded.

Figure 7:
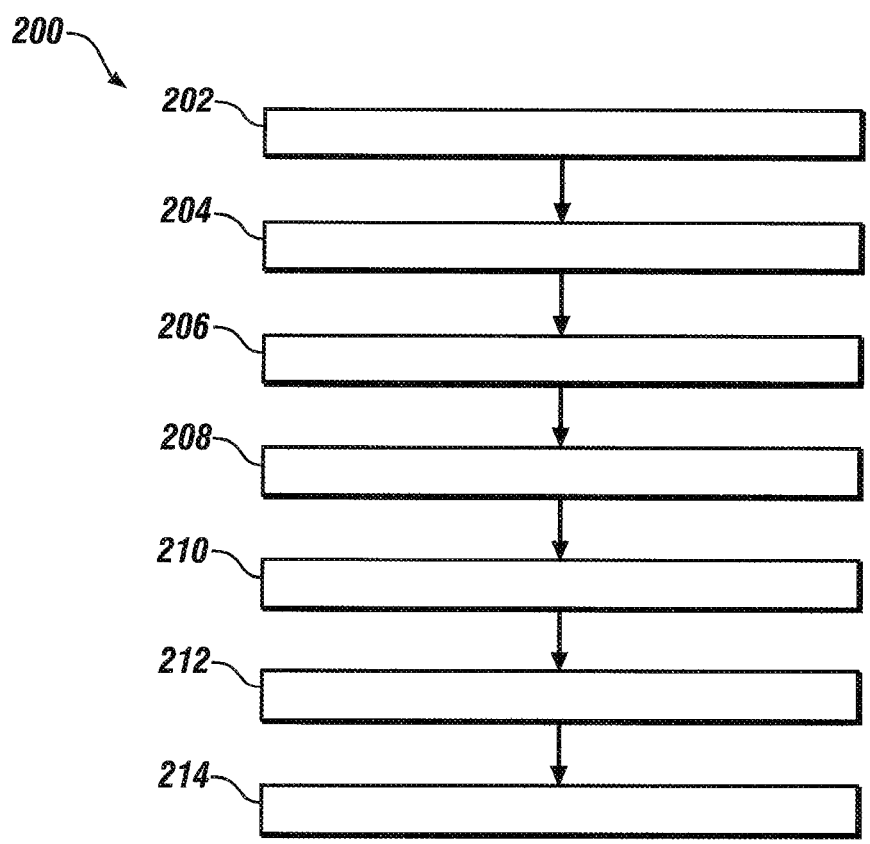
FIG. 7 is a flow diagram of a method of operation for a heads up display in accordance with one or more exemplary embodiments.

Referring to FIG. 7, a flow diagram of an example method 200 of operation for the heads up display 124 is shown in accordance with one or more exemplary embodiments. The method 200 (or process) is implemented by the heads up display 124. The method 200 includes steps 202 to 214, as illustrated. The sequence of steps is shown as a representative example. Other step orders may be implemented to meet the criteria of a particular application.

In the step 202, the heads up display 124 (HUD) receives image information via the image data signal 106. Based on the image information, the heads up display 124 generates the graphical presentation 110 in the step 204. The graphical presentation 110 is projected in the optical signal 108 toward the current position 102 on the windshield 82 in the step 206. The heads up display 124 concurrently transmits the position values 136 in the step 208 to the driver monitoring system 120 (DMS) via the gateway circuit 122 (GC).

In the step 210, the command values 134 are received from gateway circuit 122. The heads up display 124 adjusts the current position 102 to the updated position 104 based on the command values 134 in the step 212. The position values 136 are changed in the step 214 as the graphical presentation 110 moves from the current position 102 to the updated position 104. Once the graphical presentation 110 reaches the updated position 104, the updated position becomes a new position for the current position 102.

The active heads up display system 100 provides an adaptive system that redirects the graphical presentation 110 to an optimal location to be within the field of view 94 of the user 90. The field of view 94 is determined from the eye tracking information and/or the head tracking information from the driver monitoring system 120.

The driver monitoring system 120 measures a three-dimensional position of the eyes 98 and/or a head orientation 96 of the user 90. The driver monitoring system 120 computes an optimal height and/or horizontal position of the head up display 124 based on the measured gaze direction 92 of the user 90. Track values 132, that adjust the current position 102 of the graphical presentation 110 to align with the gaze direction 92/field of view 94, are sent to the gateway circuit 122 over the first bus 128. The gateway circuit 122 acts as a gateway to translate the track values 132 to command values 134 recognizable by the heads up display 124. The command values 134 are sent to the heads up display 124 via the second bus 130. In one or more embodiments, the driver monitoring system 120 may be an integral component of an Automatic Drivers Assist System (ADAS) Compute Platform (ACP) component.

The heads up display 124 relays back the actual position values 136 of the graphical presentation 110 to the gateway circuit 122. The gateway circuit 122 acts as a gateway to pass the actual position values 136 to the driver monitoring system 120 via the first bus 128 for error correction and diagnostic purposes.

A benefit of the active heads up display system 100 is a maximization of the time that the graphical presentation 110 information is in the field of view 94 of the user 90. Another benefit of the active heads up display system 100 is increased awareness when implemented in Level 2+ applications with a dual-plane heads up display 124. In Level 2+ applications, the graphical presentation 110 information in such systems includes rich data such as navigation and object/pedestrian detection being overlaid on the "real world" and possible points of interest and/or advertisements.

Numerical values of parameters (e.g., of quantities or conditions) in this disclosure, including the appended claims, are to be understood as being modified in each instance by the terms "about" and "approximately" whether or not "about" or "approximately" actually appears before the numerical value. "About" and "approximately" indicate that the stated numerical values allow some slight imprecision (with some approach to exactness in the value; about or reasonably close to the value; nearly). If the imprecisions provided by "about" and "approximately" are not otherwise understood in the art with this ordinary meaning, then "about" and "approximately" as used herein indicates at least variations that may arise from methods of measuring and using such parameters. In addition, disclosures of ranges include disclosures of each value therein and further divided ranges within the entire range. Each value within a range and the endpoints of a range are hereby disclosed as separate embodiments.

The claims may be drafted to exclude various elements. As such, this statement is intended to serve as antecedent basis for use of such exclusive terminology as "solely," "only," "at most" and the like in connection with the recitation of claim elements and/or use of "negative" limitations. As will be apparent to those of ordinary skill in the art, each individual embodiment described and illustrated herein has discrete components and features readily separated from or combined with the features of the other several embodiments without departing from the scope of the disclosure. Furthermore, recited method may be carried out in the order of events recited, or in other orders that are logically possible.

While the best modes for carrying out the disclosure have been described in detail, those familiar with the art to which this disclosure relates will recognize various alternative designs and embodiments for practicing the disclosure within the scope of the appended claims.

What is claimed is:

1. An active heads up display system comprising:
a driver monitoring system configured to track a gaze direction of a user in a three dimensional coordinate system, calculate one or more track values in response to a field of view of the user based on the gaze direction, and transmit the one or more track values on a first bus;
a gateway circuit configured to receive the one or more track values from the first bus, translate the one or more track values to one or more command values, and transmit the one or more command values on a second bus; and
a heads up display configured to receive the one or more command values from the second bus, generate a graphical presentation viewable by the user, project the graphical presentation at a current position in the three dimensional coordinate system in front of the user, and adjust the current position in the three dimensional coordinate system to an updated position centered within the field of view of the user in response to the one or more command values.

2. The active heads up display system according to claim 1, wherein:
the heads up display is further configured to transmit the current position of the graphical presentation to the gateway circuit via the second bus;
the gateway circuit is further configured to transfer the current position of the graphical presentation to the driver monitoring system via the first bus; and
the driver monitoring system is further configured to receive the current position of the graphical presentation from the first bus.

3. The active heads up display system according to claim 2, wherein the calculation of the one or more track values is in further response to the current position of the graphical presentation.

4. The active heads up display system according to claim 1, wherein the one or more track values solely adjusts a vertical position of the graphical presentation to account for one or more of a pitch and a height of a head of the user.

5. The active heads up display system according to claim 1, wherein the one or more track values adjust both a horizontal position and a vertical position of the graphical presentation.

6. The active heads up display system according to claim 1, wherein the gaze direction is an eye gaze direction.

7. The active heads up display system according to claim 6, wherein:
the driver monitoring system is further configured to track a head orientation of the user while the eye gaze direction of the user is unknown; and
the one or more track values are calculated based on the head orientation while the eye gaze direction of the user is unknown.

8. The active heads up display system according to claim 1, wherein:
the heads up display is positioned between the user and a windshield; and
the heads up display projects the graphical presentation onto the windshield.

9. The active heads up display system according to claim 8, wherein the gateway circuit is further configured to maintain the one or more command values constant in response to the track values indicating that the gaze direction is off the windshield.

10. A method of operation in an active heads up display system comprising:
tracking a gaze direction of a user in a three dimensional coordinate system with a driver monitoring system;

calculating one or more track values in response to a field of view of the user based on the gaze direction;

transmitting the one or more track values on a first bus;

receiving the one or more track values from the first bus at a gateway circuit;

translating the one or more track values to one or more command values;

transmitting the one or more command values on a second bus;

receiving the one or more command values from the second bus at a heads up display;

generating a graphical presentation viewable by the user;

projecting the graphical presentation at a current position in the three dimensional coordinate system in front of the user; and adjusting the current position in the three dimensional coordinate system to an updated position centered within the field of view of the user with the heads up display in response to the one or more command values.

11. The method according to claim 10, further comprising:

transmitting the current position of the graphical presentation to the gateway circuit via the second bus;

transferring the current position of the graphical presentation to the driver monitoring system via the first bus; and receiving the current position of the graphical presentation at the driver monitoring system from the first bus.

12. The method according to claim 11, wherein the calculating of the one or more track values is in further response to the current position of the graphical presentation.

13. The method according to claim 10, wherein the one or more track values solely adjusts a vertical position of the graphical presentation to account for one or more of a pitch and a height of a head of the user.

14. The method according to claim 10, wherein the one or more track values adjust both a horizontal position and a vertical position of the graphical presentation.

15. The method according to claim 10, wherein the gaze direction is an eye gaze direction.

16. The method according to claim 15, further comprising:

tracking a head orientation of the user with the driver monitoring system while the eye gaze direction of the user is unknown, wherein the one or more track values are calculated based on the head orientation while the eye gaze direction of the user is unknown.

17. The method according to claim 10, wherein:

the heads up display is positioned between the user and a windshield; and the heads up display projects the graphical presentation onto the windshield.

18. The method according to claim 17, further comprising:

maintaining the one or more command values constant in the gateway circuit in response to the track values indicating that the gaze direction is off the windshield.

19. A vehicle comprising:

a windshield; and an active heads up display system including;

a driver monitoring system configured to track a gaze direction of a user in a three dimensional coordinate system, calculate one or more track values in response to a field of view of the user based on the gaze direction, and transmit the one or more track values on a first bus;

a gateway circuit configured to receive the one or more track values from the first bus, translate the one or more track values to one or more command values, and transmit the one or more command values on a second bus; and a heads up display configured to receive the one or more command values from the second bus, generate a graphical presentation viewable by the user, project the graphical presentation on the windshield at a current position in the three dimensional coordinate system in front of the user, and adjust the current position in the three dimensional coordinate system to an updated position centered within the field of view of the user in response to the one or more command values.

20. The vehicle according to claim 19, wherein the heads up display is a dual-plane heads up display.

* * * * *